3,712,871
PHOTOPOLYMERIZABLE COMPOSITIONS USEFUL
AS A PRINTING INK VEHICLE
George Pasternack, Chicago, Ill., assignor to Continental
Can Company, Inc., New York, N.Y.
No Drawing. Filed Feb. 18, 1971, Ser. No. 116,626
Int. Cl. C09d 3/64, 5/32, 11/02
U.S. Cl. 260—22 XA
11 Claims

ABSTRACT OF THE DISCLOSURE

A photopolymerizable composition comprised of a mixture of (1) the resinous condensation product of (a) an acid modified drying oil prepared from an ethylenically unsaturated dicarboxylic acid and a drying oil (b) the dihydroxyalkyl ether of a bisphenol (2) a polymerizable unsaturated polyester prepared from a polyhydric alcohol and an alpha, beta-ethylenically unsaturated monocarboxylic acid and (3) a chlorinated polyphenyl.

The photopolymerizable compositions are useful in the preparation of vehicles for printing inks which when printed on a substrate dry rapidly to a non-offsetting condition under irradiation with ultraviolet light.

BACKGROUND OF THE INVENTION

(1) Field of the invention

This invention relates to photo-polymerizable compositions and more particularly to photo-polymerizable compositions which are useful as printing ink vehicles which undergo rapid drying on exposure to ultraviolet radiation.

(2) The prior art

Printing or decorating metal substrates is conventionally accomplished using inks composed predominately of a drying oil vehicle pigmented to the desired color which dry by absorbing oxygen from the surrounding air. This type of ink requires a considerable time to dry.

In the outside decoration of a metal container, such as a can body, the printing ink is applied to flat metal sheets and the printed sheets are stacked to await fabrication into a can. Since in the decoration operation the freshly printed sheet travels only for a few seconds and/ or feet before it is stacked, the chances for offsetting of the ink from the printed to the unprinted sides of the stacked sheets are considerable. Offsetting is very undesirable since it ruins the apperance of the printed work. Smearing and smudging of the slowly drying ink is also encountered where successive printing runs with different colored inks are to be made on the same sheet surface to prepare a multi-color decoration.

In addition to the problem of offsetting, conventional printing inks prepared with drying oil vehicles also contain a substantial amount of a volatile organic solvent which must be removed as the ink dries. The evaporation of the solvent creates an air pollution problem which many present day communities will not tolerate.

One method of avoiding the use of solvents in preparing printing ink vehicles which has been attempted by the art is to prepare the vehicle from a drying oil or other unsaturated composition of suitable viscosity which can be polymerized and dried by exposure to ultraviolet radiation as for example, U.S. 2,453,769, 2,453,770, 3,013,895, 3,051,591, 3,326,710, and 3,511,710. These vehicle compositions have only been partly successful as the photosensitizers and catalysts incorporated in the vehicles to maximize the responsiveness of the vehicle composition to ultraviolet radiation either cause premature gellation of the composition or are costly chemicals whose incorporation in the vehicle increases the cost of the vehicle to a point wherein the ink is too costly for commercial printing operations.

SUMMARY OF THE INVENTION

In accordance with the present invention, there is provided a photopolymerizable composition useful as a printing ink vehicle which is stable and can be stored for a long period of time under ordinary conditions and which dries rapidly upon irradiation with ultraviolet light to a hard insoluble film, which composition is comprised of a mixture of (1) the resinous condensation product of (a) an acid modified drying oil prepared from an ethylenically unsaturated dicarboxylic acid and a drying oil (b) the dihydroxyalkyl ether of a bisphenol (2) a polymerizable, unsaturated polyester prepared from a polyhydric alcohol and an alpha, beta-ethylenically unsaturated monocarboxylic acid and (3) a chlorinated polyphenyl.

Printing inks, prepared using the compositions of this invention as vehicles exhibit excellent adhesion to a variety of substrates. Printed impressions made with these inks and exposed to ultraviolet light for several seconds become sufficiently dry so that the problem of offsetting on successive sheets coming from a printing press is avoided. As no volatile solvents are employed in the preparation of the ink vehicles the pollution problem encountered with these solvents is also avoided.

PREFERRED EMBODIMENTS

The bisphenol ether used to prepare the resinous condensation product component is a dihydroxyalkylether of a bisphenol having the general formula:

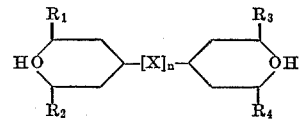

wherein X is an alkylene group having 1 to 5 carbon atoms and $n$ is zero or 1, and $R_1$, $R_2$, $R_3$ and $R_4$ represent either hydrogen, halogen or an alkyl group having 1 to 3 carbon atoms. Preferably, at least one of the R groups is halogen and most desirably all the R groups are halogen. Representative bisphenol compounds include 4,4'-dihydroxybenzophenone,
2,2-bis (4-hydroxy-2-methylphenyl) propane,
2,2-bis (4-hydroxy-3-chlorophenyl) propane,
2,2-bis (4-hydroxy,3,5-dichlorophenyl) propane,
2,2-bis (3,5-dichloro-4-hydroxyphenyl) propane,
bis (4-hydroxyphenyl) methane,
bis (3,5-dichloro-4-hydroxyphenyl) methane,
bis (3,5-dibromo-4-hydroxyphenyl) methane,
bis (3-chloro-4-hydroxyphenyl) methane,
bis (3-bromo-4-hydroxyphenyl) methane,
bis (3,5-dimethyl-4-hydroxyphenyl) methane,
1,1-bis (4-hydroxyphenyl) ethane,
1,1-bis (3,5-dichloro-4-hydroxyphenyl) ethane,
2,2-bis (3,5-dichloro-4-hydroxyphenyl) propane,
1,1-bis (3,5-dibromo-4-hydroxyphenyl) n-butane, 2,2-bis (3-chloro-4-hydroxyphenyl) n-butane,
1,1-bis (3-bromo-4-hydroxyphenyl) isobutane,
4,4'-dihydroxybiphenyl,
3,5,3',5'-tetrachloro-4,4'-dihydroxybiphenyl,
3,5,3',5'-tetrabromo-4,4'-dihydroxybiphenyl,
3,3'-dichloro-4,4'-dihydroxybiphenyl,
3,3'-dibromo-4,4'-dihydroxybiphenyl,
3,5,3',5'-tetramethyl-4,4'-dihydroxybiphenyl,
3,3'-dimethyl-4,4'-dihydroxybiphenyl.

The bisphenol-dihydroxyalkyl ethers used in preparing the resinous condensation product are known to the art and are conventionally prepared by reacting an alkylene oxide having 2 to 4 carbon atoms such as ethylene oxide, propylene oxide, butylene oxide with the bisphenol in the presence of base such as sodium hydroxide at 90–95° under the saturating pressure of the alkylene oxide.

The bisphenol-dihydroxyalkyl ethers are available commercially. A commercially available chlorinated bisphenol ether which is particularly suitable in the preparation of the resinous condensation product component of the present invention is PR–1000W available from the Dover Chemical Company. PR–1000W is 2,2'-(isopropylidene bis (3,5-dichloro-p-phenoxy) propylene oxide diol, a viscous amber liquid having the formula

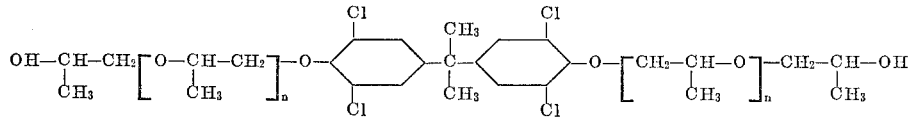

Where n ≅ 0.9 and the following chemical properties:

| | |
|---|---|
| Molecular wt. | 587 |
| Hydroxy number | 191 |
| Hydroxy equivalent wt. | 293.5 |
| Average moles propylene oxide/mole bisphenol | 3.82 |
| Chlorine content percent | 23.1 |

The acid modified drying oil which is reacted to prepare the resinous condensation product is the addition product of an unsaturated drying oil, for example, linseed oil, tung oil, cottonseed oil, sunflower oil and perilla oil, and the like with an alpha, beta-ethylenically unsaturated dicarboxylic acid having 4 to 10 carbon atoms (which terminology includes the anhydrides which react in a manner similar to the acid) such as maleic acid, maleic anhydride, fumaric acid, itaconic acid, citraconic acid, citraconic anhydride, mesaconic acid and the like. The reaction between the drying oil and the dicarboxylic acid takes place readily without the use of a catalyst at molar ratio in the range of 1:1 to 1:3 for a period of 0.5 to 3 hours at 100 to 300° C. or higher, with the reaction generally being carried out between 50° to 200° C.

While the exact nature of the reaction product of the dicarboxylic acid or anhydride with the drying oil is not known with certainty, it is believed that the reaction takes place by addition of the unsaturated linkage of the acid or anhydride to the carbon chain of the oil. In the case of non-conjugated bonds, such as are present in linseed oil, the reaction may take place with the methylene group adjacent to non-conjugated bond. In the case of oils having conjugated double bonds, such as tung oil, the reaction is probably of the Diels-Alder type.

Tung oil is a preferred drying oil for reaction with the unsaturated acid in preparation of the acid modified drying oil component.

The molecular structure of tung oil is a glyceride of an unsaturated acid of 18 carbon atoms, largely eleostearic acid which can be expressed as

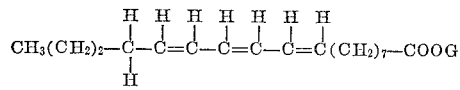

where G indicates connection to a glyceryl group.

The bisphenol ether/acid modified drying oil resinous condensation product component of the present invention is prepared by heating the bisphenol ether with the dicarboxylic acid modified drying oil at about 100° C. to 200° C. using 0.5 to 0.6 mole of bisphenol ether for 1 mole of dicarboxylic acid contained in the acid modified drying oil for 2 to 4 hours to effect the reaction.

The polymerizable unsaturated polyester component of the present invention is prepared from a polyhydric alcohol having from 2 to 6 hydroxyl groups and an alpha, beta ethylenically unsaturated carboxylic acid having from 3 to 6 carbon atoms, generally 50 to 100 percent of the hydroxyl groups being esterified with the ethylenically unsaturated monocarboxylic acid. Illustrative polyhydric alcohols which may be used to prepare the unsaturated polyesters include ethylene glycol, propylene glycol, diethyleneglycol, butanediol, trimethylolethane, trimethylolpropane, trimethylolhexane, glycerol, sorbitol, mannitol, pentaerythritol and mixtures of these polyhydric alcohols. Unsatutrated monocarboxylic acids which may be reacted with the polyhydric alcohols to prepare the unsaturated polyesters include acrylic acid, methacrylic acid and ethacrylic acid. Examples of suitable esters include ethylene glycol diacrylate, diethylene glycol dimethacrylate, butanediol diacrylate, trimethylolpropane triacrylate, trimethylolhexane trimethacrylate, pentaerythritol tetra acrylate, glycerol triacrylate, sorbitol tetraacrylate and mannitol tetraacrylate.

Chlorinated polyphenyl compounds suitable for use in the compositions of the present invention are chlorinated biphenyls and triphenyls which contain from about 30 to 70% by weight of chemically combined chlorine. The pure compounds formed by chlorination of biphenyl or triphenyl are crystalline compounds; however mixtures containing a number of such compounds are either liquids or resins. Useful compositions include liquid mixtures of chlorinated polyphenyls having an average chlorine content of about 50 to 65%. The resinous materials, which include chlorinated biphenyls containing about 60 to 70% combined chlorine, chlorinated triphenyls containing about 40 to 60% chlorine, and blends of chlorinated biphenyls and triphenyls having an average chlorine content of about 75%, are also employed in the compositions of the present invention.

Chlorinated polyphenyls are available commercially and include polyphenyl compounds manufactured by the Monsanto Chemical Company and sold under the tradename "Aroclors." For example Aroclor 1232 is a chlorinated biphenyl having a chlorine content of 32 percent and a specific gravity of 1.270. "Aroclor 1254" is a chlorinated biphenyl having a chlorine content of 54% and a specific gravity of 1.505. "Aroclor 4465" is a 60:40 blend of chlorinated biphenyls and chlorinated triphenyls having a chlorine content of 65 percent, a specific gravity of 1.670 and a softening point of 45°–52° C.

Aroclor 5460 is a chlorinated triphenyl having a chlorine content of 58.5 to 60%, a softening point of 98 to 105° C. and a specific gravity of 1.670.

Printing ink vehicles prepared from the compositions of present invention are comprised of 30 to 50% by weight, and preferably 35 to 45% by weight of the bisphenol ether/acid modified drying oil condensation product, 30 to 60% by weight and preferably 40 to 50% by weight of the polymerizable unsaturated polyester and 10 to 40% by weight and preferably 10 to 20% by weight of the chlorinated polyphenyl.

In general, printing inks prepared using the compositions of the present invention as vehicles are prepared in the same manner as conventional printing inks only using the resinous vehicle as disclosed herein.

Coloring compounds used in preparing the ink compositions of the present invention are dyes and pigments. Examples of these compounds are pigments such as cadmium yellow, cadmium red, cadmium maroon, black iron oxide, titanium dioxide, chrome green, gold, silver, aluminum and copper; and dyes such as alizarine red, Prussian blue, auramin naphthol, malachite green and the like. Ordinarily the concentration of pigment or dye will be present in the ink vehicle in a weight percent of from about 30 to 70%.

In addition to the coloring compounds set forth above, printing inks of the present invention may contain any of the conventional additives used in inks. The ink may contain the conventional antioxidants including phenolic substances such as 2,6-ditertiarybutyl-4-methylphenol, hydroquinone and resorcinol, aromatic amines such as diphenylamine and metal salts such as stannous chloride.

In printing metal surfaces with printing inks prepared using the compositions of the present invention as vehicles, the ink is applied using a printing press conventionally used for printing on a metal substrate. Conventional printing processes leave on the surface of the metal substrate a printed layer of approximately 0.1 to 0.2 mil thickness. Once the metal substrate, generally in the form of a sheet, is printed, the substrate is positioned to pass under a source of ultraviolet light to dry the ink. In most instances, the ultraviolet light source is maintained at about 0.5 to about 5 inches from the printed substrate undergoing irradiation.

Rapid drying of the ink is effected within a 2 to 5 second period using ultraviolet light emitted from an artificial source having a wavelength in the range between 4000A and 1800A. The output of commercially available energy sources can vary between 100 watt/in. to 200 watt/in. of arc.

High pressure mercury vapor discharge tubes in quartz are the preferred source of ultraviolet light. Medium-pressure mercury vapor discharge tubes in quartz may be employed if desired.

As regards any particular conditions of source and distance, the duration of the irradiation treatment can be determined by a few trials.

The following example will further illustrate the practice of the invention.

EXAMPLE

A maleic acid modified tung oil was prepared by reacting 1,303.0 grams (1.5 mole) of raw tung oil with 202.5 grams (2.0 mole) of maleic anhydride at 50° C. for 0.5 hour.

1.505.5 grams (2.0 mole) of the so prepared maleic acid modified tung oil was reacted with 598 grams (1.0 mole) of 2,2'-(isopropylidene bis (3,5-dichloro-p-phenoxy)) propylene oxide diol (PR-1000W obtained from Dover Chemical) under nitrogen at 150° C. for three hours to obtain a resinous condensation product.

A printing ink vehicle was prepared from a mixture of the following components:

Parts by weight
(A) Resinous reaction product of 2,2'-(isopropylidene bis (3,5-dichloro-p-phenoxy)) propylene oxide diol+maleic anhydride modified tung oil prepared above _____ 2103.5
(B) Polymerizable polyacrylate ester _____ 2306.5
 Mixture composed of:
  (a) 1068.0 parts trimethylolpropane triacrylate.
  (b) 1068.0 parts pentaerythritol tetracrylate.
  (c) 170.5 parts 1,4-butanediol diacrylate.
(C) Chlorinated triphenyl (Aroclor 5460) ____ 587.5
(D) Hydroquinone _____ 2.5
(E) Stannous chloride _____ 0.5

A white ink was prepared on a three roll mill using 40% by weight of the ink vehicle prepared above and 60% titanium dioxide pigment.

Using a conventional lithographic technique (ATF Chief 20 A printing press) the white ink was printed upon the surface of 5 x 3 inch steel plates of the type used in the manufacture of metal cans.

After application of the printing, the printed plates were placed on a continuously moving conveyor which passed under a bank of three 12 inch high pressure mercury lamps mounted parallel to each other. The lamps emitted approximately 100 watts/in. radiation. The conveyor was adjusted so that the printed plates traveled under the surface of the bank of ultraviolet tubes so that the plates were 1.0 inch from the tube surface. The speed of the conveyor belt was adjusted so that the printed plates were exposed to the ultraviolet radiation for about 3.5 seconds which time was sufficient to effect total drying of the printing impression.

The so dried plate was capable of undergoing successive printing operations without smearing and exhibited excellent adhesion to the steel plate before and after ultraviolet drying. Ink transfer from press to plate was comparable to that of conventional drying oil inks.

The stability of the ink, as measured in an inkometer at 90° F. and at a speed of 1200 r.p.m. for ten minutes was constant.

The printing ink vehicle stored in a series of sealed glass containers exhibited no gelation for at least 8 weeks.

What is claimed is:
1. A photopolymerizable composition comprised of a mixture of
 (1) 30 to 50% by weight of a resinous condensation product of
  (a) an acid modified drying oil prepared from an ethylenically unsaturated dicarboxylic acid having 4 to 10 carbon atoms and an unsaturated natural drying oil and
  (b) a dihydroxyalkyl ether of a bisphenol prepared from an alkylene oxide having 2 to 4 carbon atoms and a bisphenol having the general formula:

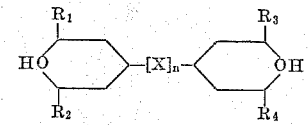

wherein X is an alkylene group having 1 to 5 carbon atoms n is zero or 1 and $R_1$, $R_2$, $R_3$ and $R_4$ are selected from the group consisting of hydrogen, halogen and alkyl groups having 1 to 3 carbon atoms,
 (2) 30 to 60% by weight of a polymerizable, unsaturated polyester prepared from a polyhydric alcohol having 2 to 6 hydroxy groups and an alpha, beta-ethylenically unsaturated monocarboxylic acid having 3 to 6 carbon atoms and
 (3) 10 to 40% by weight of a chlorinated polyphenol having a chlorine content of 30 to 70% by weight.
2. The composition of claim 1 wherein the drying oil is tung oil.
3. The composition of claim 1 wherein the dicarboxylic acid is maleic anhydride.
4. The composition of claim 1 wherein all the R groups in the bisphenol are chlorine.

5. The composition of claim 1 wherein the bisphenol is 2,2-bis (3,5-dichloro-4-hydroxyphenyl) propane.

6. The composition of claim 1 wherein the alkylene oxide is propylene oxide.

7. The composition of claim 1 wherein the polyhydric alcohol is trimethylol propane.

8. The composition of claim 1 wherein the polyhydric alcohol is pentaerythritol.

9. The composition of claim 1 wherein the polyhydric alcohol is 1,4-butanediol.

10. The composition of claim 1 wherein the monocarboxylic acid is acrylic acid.

11. A printing ink comprised of a coloring compound in a vehicle comprised of the composition of claim 1.

References Cited
UNITED STATES PATENTS

| | | | |
|---|---|---|---|
| 3,551,235 | 12/1970 | Bassemir et al. | 260—23 |
| 3,013,895 | 12/1961 | Agruss | 117—38 |
| 3,051,591 | 8/1962 | Sites et al. | 106—28 |

DONALD E. CZAJA, Primary Examiner

R. W. GRIFFIN, Assistant Examiner

U.S. Cl. X.R.

106—28; 117—38, 161 K; 204—159.19; 260—22 EP, 22 CB, 23 P